United States Patent
Okada et al.

(10) Patent No.: US 6,790,558 B2
(45) Date of Patent: Sep. 14, 2004

(54) ELECTRODE ALLOY POWDER AND METHOD OF PRODUCING THE SAME

(75) Inventors: Yukihiro Okada, Katano (JP); Miho Kayama, Hirakata (JP); Yoichiro Tsuji, Katano (JP)

(73) Assignees: Matsushita Electric Industrial Co., Ltd., Osaka (JP); Toyota Jidosha Kabushiki Kaisha, Aichi-ken (JP)

( * ) Notice: Subject to any disclaimer, the term of this patent is extended or adjusted under 35 U.S.C. 154(b) by 265 days.

(21) Appl. No.: 10/045,839

(22) Filed: Oct. 19, 2001

(65) Prior Publication Data

US 2002/0122982 A1 Sep. 5, 2002

(30) Foreign Application Priority Data

Dec. 27, 2000 (JP) .......................... 2000-398964

(51) Int. Cl.[7] .................................................. H01M 4/18
(52) U.S. Cl. ................................... 429/218.2; 420/900
(58) Field of Search ...................... 429/218.2; 420/900

(56) References Cited

U.S. PATENT DOCUMENTS

| | | | | |
|---|---|---|---|---|
| 5,605,585 A | * | 2/1997 | Yamamoto et al. ......... | 148/513 |
| 5,932,034 A | * | 8/1999 | Ishii et al. .................. | 148/513 |
| 6,238,822 B1 | * | 5/2001 | Imoto et al. ............. | 429/218.2 |
| 6,605,387 B1 | * | 8/2003 | Ueda et al. .............. | 429/218.2 |

FOREIGN PATENT DOCUMENTS

| | | |
|---|---|---|
| JP | 61285658 A | 12/1986 |
| JP | 07073878 A | 3/1995 |
| JP | 09007591 A | 1/1997 |
| JP | 09171821 A | 6/1997 |
| JP | 11339793 A | 12/1999 |

* cited by examiner

*Primary Examiner*—Carol Chaney
(74) *Attorney, Agent, or Firm*—Akin Gump Strauss Hauer & Feld, L.L.P.

(57) ABSTRACT

A method of producing an electrode alloy powder is disclosed, wherein, to provide an electrode alloy powder capable of yielding an alkaline storage battery excellent in high-rate discharge property, self-discharge property and cycle life, a first step of immersing a starting powder comprising a hydrogen storage alloy containing 20 to 70 wt % of Ni in an aqueous solution containing 30 to 80 wt % of sodium hydroxide at a temperature of 90° C. or higher and a second step of washing with water the powder which has been subjected to the first step are conducted.

14 Claims, 3 Drawing Sheets

Alloy a     Alloy b     Alloy c

ELECTRODE ALLOY POWDER AND METHOD OF PRODUCING THE SAME

BACKGROUND OF THE INVENTION

An electrode using a hydrogen storage alloy capable of reversibly absorbing and desorbing hydrogen has a greater theoretical capacity density as compared with a cadmium electrode, and does not deform or cause the formation of dendrites in contrast with a zinc electrode. Therefore, it has a long cycle life and is pollution-free. Moreover, because of the high energy density, such an electrode has been frequently used as the negative electrode for a nickel-metal hydride storage battery and applied to, for example, the power source for small portable appliances, and is expected to undergo further development in the future.

Recently, the nickel-metal hydride storage battery has been attracting attentions as the power source for electric automobiles and the like, and there has been a strong demand for the improvement of the output characteristics and storage characteristics thereof.

In general, an $MmNi_5$ alloy, where Mm is a mixture of rare earth elements, having a $CaCu_5$ type crystal structure in which Ni is partly replaced by Co, Mn, Al, Cu or the like is widely used as the negative electrode material for the nickel-metal hydride storage battery. Additionally, researches and developments of a novel hydrogen storage alloy have been actively progressed in order to realize further miniaturization and weight saving for batteries.

When a produced hydrogen storage alloy is used as an electrode alloy powder as it is, the electrode performance is generally insufficient at the initial charge/discharge cycles. For this reason, it is preferable to conduct pre-treatments on the hydrogen storage alloy to improve the activity thereof, and various methods have been proposed for such treatments.

Heretofore, the following methods have been proposed as methods for improving the activity of a hydrogen storage alloy: a method in which components for improving the electrochemical activity of the hydrogen storage alloy, such as Ni, is physically applied onto the surface of the hydrogen storage alloy; and a method in which the surface of the hydrogen storage alloy is plated with Ni by means of, for example, a non-electrolytic plating. However, from the practical standpoint, a more promising method is the one in which the surface of the hydrogen storage alloy is chemically etched to improve the activity thereof since the method requires a relatively low cost. More specifically, the following methods have been disclosed:

(1) a method in which the hydrogen storage alloy is immersed in an aqueous acid solution such as hydrochloric acid (e.g., Japanese Unexamined Patent Publication No. hei 7-73878);

(2) a method in which the hydrogen storage alloy is immersed in an aqueous alkaline solution (e.g., Japanese Unexamined Patent Publication No. sho 61-285658); and (3) a method in which the hydrogen storage alloy is immersed in an aqueous alkaline solution, followed by immersing in an aqueous acid solution (e.g., Japanese Unexamined Patent Publication Nos. hei 9-7591 and hei 9-171821).

The acid treatment in method (1) is not very effective in improving the activity of the hydrogen storage alloy, although it removes an oxide or hydroxide on the surface of the hydrogen storage alloy to improve the initial activity to some level. The reason is presumably because all the constituting elements of the hydrogen storage alloy are dissolved into the aqueous acid solution, so that an Ni-rich layer, which helps to improve the activity of the hydrogen storage alloy, is difficult to be formed on the surface of the hydrogen storage alloy. Additionally, the hydrogen storage alloy is exposed to an electrolyte of high alkali concentration in the alkaline storage battery. However, the dissolution behaviors of the constituting elements of the hydrogen storage alloy in an aqueous acid solution are different from those in an aqueous alkaline solution. The hydrogen storage alloy treated in the aqueous acid solution has a greater amount of the constituting elements to be dissolved into the electrolyte inside the battery than the one treated with the aqueous alkaline solution, and has accordingly shorter cycle life.

By the alkali treatment in method (2), only those unstable in the aqueous alkaline solution out of the constituting elements of the hydrogen storage alloy are dissolved into the aqueous solution, while the Ni-rich layer is formed on the surface of the hydrogen storage alloy. However, the dissolved elements are converted into an oxide or hydroxide to be deposited on the entire surface of the hydrogen storage alloy. Consequently, the conductivity of the hydrogen storage alloy is decreased, and the output characteristics of the resultant battery become insufficient.

By the combination of the alkali treatment and the acid treatment in method (3), the oxide or hydroxide deposited through the treatment with the aqueous alkaline solution are removed from the hydrogen storage alloy by the subsequent treatment with the aqueous acid solution, thereby improving the initial activity of the hydrogen storage alloy. However, this method requires a number of steps, such as an alkali treatment, washing with water, an acid treatment and another washing with water, presenting a problem of an increase in cost. Moreover, it presents another problem that the cycle life of the resultant battery becomes short, although not so short as in the case of the acid treatment in method (1), because the treatment with the aqueous acid solution is conducted at the end of the process.

BRIEF SUMMARY OF THE INVENTION

The present invention relates to an electrode alloy powder which comprises a hydrogen storage alloy and is used for nickel-metal hydride storage batteries and the like, and to a method of producing the same.

The present invention is to effectively provide a highly conductive electrode alloy powder which is less prone to corrosion in an alkaline electrolyte and exhibits a superior electrode activity even at the initial charge/discharge cycles. By using the electrode alloy powder of the present invention, an alkaline storage battery of excellent self-discharge and high-rate discharge properties and a long cycle life can be obtained.

The present invention relates to a method of producing an electrode alloy powder, comprising: a first step of immersing a starting powder comprising a hydrogen storage alloy containing 20 to 70 wt % of Ni in an aqueous solution containing 30 to 80 wt % of sodium hydroxide at a temperature of 90° C. or higher and; a second step of washing with water the powder which has been subjected to the first step.

The present invention also relates to the method, further comprising a third step of mixing the powder with an oxidizing agent in water after the second step.

The starting powder preferably has a $CaCu_5$ type crystal structure and comprises an alloy containing a mixture of rare earth element, Ni, Co, Mn and Al.

In this case, the Co content in the starting powder is preferably 6 wt % or less.

The mean particle size of the starting powder is preferably 5 to 30 μm.

The starting powder generally contains oxygen on the surface thereof and the oxygen content is preferably 1 wt % or less.

It is preferable to conduct an additional step of mixing the starting powder with water prior to the first step, and conduct the first step by using the starting powder in a moistened state.

In this case, it is effective that the additional step is a step of pulverizing coarse particles of a hydrogen storage alloy containing 20 to 70 wt % of Ni under a condition having water to have a mean particle size of 5 to 30 μm.

It is preferred that the first step is a step of immersing the starting powder in the aqueous solution containing 30 to 80 wt % of sodium hydroxide for 0.2 to 3 hours.

It is preferred that the second step is a step of washing with water the powder which has been subjected to the first step until a pH of used water becomes 9 or less.

It is preferred that the third step is a step of adding an oxidizing agent in a water having a pH of 7 or more in which the powder is dispersed. For example, the third step preferably comprises a step of adding, while stirring, a hydrogen peroxide solution in a water having a pH of 7 or more in which the powder is dispersed. It is preferred that the amount of hydrogen peroxide to be added is 0.5 to 15 parts by weight per 100 parts by weight of the powder.

The present invention also relates to an electrode alloy powder produced by the method in accordance with the present invention described above. More particularly, it relates to an electrode alloy powder which contains 3 to 9 wt % of a magnetic substance comprising metallic nickel.

The electrode alloy powder obtained by the production method of the present invention can yield a battery having an excellent high-rate discharge property especially in the low temperature region.

The present invention also relates to a battery including the above-described electrode alloy powder.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Since an aqueous KOH solution is generally used as the electrolyte in an alkaline storage battery, it has been a common technical knowledge to use an aqueous KOH solution as the aqueous alkaline solution required in the production process of an electrode alloy powder. On the other hand, the most remarkable feature of the present invention lies in that an aqueous NaOH solution is used, among all aqueous alkaline solutions.

Furthermore, the present invention uses an aqueous alkaline solution at a relatively high temperature and of high alkali concentration compared with the conventional ones, i.e., the present invention uses an aqueous solution containing 30 to 80 wt % of NaOH at 90° C. or higher and up to the boiling point of the solution.

When an aqueous NaOH solution of high concentration is used, the effect of removing an oxide, which is generally present on the surface of the starting powder comprising the hydrogen storage alloy, significantly improves as compared with the conventional alkali treatment using mainly a KOH aqueous solution. Therefore, a battery using an electrode alloy powder obtained by the production method of the present invention exhibits an excellent high-rate discharge property from the initial charge/discharge cycles. Furthermore, the use of the aqueous NaOH solution is advantageous in that the time required for the alkali treatment is relatively short. The aqueous NaOH solution used in the present invention may contain an alkali other than 30 to 80 wt % of NaOH, such as KOH or LiOH.

The starting powder comprising a hydrogen storage alloy often comprises a film of an oxide or the like on the surface thereof. However, it is preferred that the film content is as small as possible. Accordingly, the oxygen content in the starting powder is preferably 1 wt % or less. The reason is that the alkali treatment cannot produce sufficient effect if the oxygen content exceeds 1 wt %.

It is preferred that the production method of the present invention is conducted by wet process from beginning to end in order to prevent the hydrogen storage alloy from being oxidized in the middle of the production process and to increase the effect of the alkali treatment. In other words, it is preferred that the hydrogen storage alloy is constantly moistened with water.

From the above standpoint, when a hydrogen storage alloy obtained by casting process or the like is pulverized to be used in the present invention, it is effective to pulverize the coarse particles of the hydrogen storage alloy under a condition having water to obtain a hydrogen storage alloy powder in a moistened state, and use the moistened powder as the starting material. However, it is also effective to pulverize the coarse particles of the hydrogen storage alloy by dry process, and to moisten the pulverized hydrogen storage alloy with water before conducting the alkali treatment. Also, when a hydrogen storage alloy obtained by an atomization process or the like is used, the hydrogen storage alloy powder may be moistened with water before conducting the first step, because it requires no further pulverization.

The second step of washing with water the powder subjected to the alkali treatment is preferably terminated after the pH of the used washing water becomes 9 or less. This is because the oxide or the like present on the surface of the alloy powder may not be sufficiently removed if the washing is terminated before the pH of the used washing water becomes 9 or less. The washing is preferably conducted while the alloy powder is being stirred with water.

A hydrogen storage alloy used as the starting powder should be capable of electrochemically absorbing and desorbing hydrogen with high efficiency. For this purpose, the alloy powder preferably contains at least 20 to 70 wt % of Ni. When a starting powder comprising the hydrogen storage alloy containing 20 to 70 wt % of Ni is immersed in an aqueous alkaline solution, a fine magnetic substance comprising metallic nickel is formed in such a manner as to cover the alloy powder.

Herein, a magnetic substance comprising metallic nickel means a substance with ferromagnetism consisting mainly of metallic Ni which has been produced by an alkali treatment. The amount of the magnetic substance comprising metallic nickel is expressed as a metallic nickel content obtained by measuring the saturation magnetization of the alloy powder at a magnetic field of, for example, 10 kOe assuming that the saturation magnetization is entirely based on the metallic nickel. In the alkali treatment, metallic cobalt or the like, which exhibits ferromagnetism, is also produced, so that the amount of the magnetic substance comprising metallic nickel obtained in the above manner is exactly the total amount of metallic nickel, metallic cobalt and the like. Hereinafter, a magnetic substance comprising metallic nickel is simply referred to as "a magnetic substance".

In order to obtain an electrode which has a high activity from the initial charge/discharge cycles and exhibits an excellent high-rate discharge property at a low temperature to an ordinary temperature, the electrode alloy powder desirably contains 3 wt % or more of the magnetic substance. For increasing the magnetic substance content, it is effective to increase the NaOH concentration and the temperature of the aqueous solution used in the alkali treatment, and to prolong the immersing time.

On the other hand, when the magnetic substance content in the electrode alloy powder exceeds 9 wt %, the hydrogen absorbing ability of the alloy powder is decreased with a further increase in the magnetic substance content, decreasing the energy density of the resultant electrode. From the practical point of view, the upper limit of the magnetic substance content is 9 wt %.

The composition of the hydrogen storage alloy preferably contains a mixture of rare earth elements (Mm: misch metal) and each of Ni, Co, Mn and Al as the essential constituting elements. Further, the hydrogen storage alloy has preferably a $CaCu_5$ type crystal structure.

In recent years, $MmNi_5$ based hydrogen storage alloys having a $CaCu_5$ type structure have been put into practical use. Since the materials for such alloys are expensive, the cost reduction is an important challenge. Among the materials, Co, which plays an important role in prolonging the cycle life of the battery, is particularly expensive. In order to realize a low cost hydrogen storage alloy, it is preferable to reduce the Co content to 6 wt % or less.

In the first step, it is preferred that the starting powder to be immersed in the aqueous NaOH solution has preferably a mean particle size of 5 to 30 $\mu m$. If the mean particle size is less than 5 $\mu m$, the hydrogen absorbing ability of the alloy powder is significantly decreased. On the contrary, if it is above 30 $\mu m$, the high-rate discharge property of the resultant battery is deteriorated due to the decreased specific surface area.

In the above treatment using mainly NaOH, an oxide and hydroxide on the surface of the hydrogen storage alloy are more easily removed and a Ni-rich layer, which helps to improve the activity of the hydrogen storage alloy, is more easily formed on the alloy surface, as compared with a conventional alkali treatment using mainly KOH. For this reason, the electrode using the hydrogen storage alloy of the present invention has an improved initial activity.

The resultant alloy has a high activity on the surface thereof and is highly reactive. Additionally, the alloy may absorb hydrogen generated due to the dissolution of the constituting elements of the alloy during the alkali treatment, and the absorbed hydrogen may react with oxygen. Because of these, there is a possibility that the alloy may generate heat when the suction filtration is performed in the atmosphere on the alloy subjected to the alkali treatment.

Therefore, in the present invention, the powder which has been washed with water in the second step is mixed with an oxidizing agent in the subsequent third step. The treatment of the alloy powder with the oxidizing agent allows the hydrogen absorbed in the alloy to be chemically removed. Once the hydrogen in the alloy is removed, the reaction between hydrogen and oxygen hardly occurs even when the alkali-treated alloy powder is exposed to the atmosphere. As a result, heat generation during the production process can be suppressed, improving the safety of the process.

Another method appears to be possible in which the hydrogen storage alloy is further immersed in an aqueous acid solution after it is immersed in an aqueous alkaline solution, and then treated with a dehydrogenizing agent (Japanese Patent Application No. hei 10-332399, specification). However, this method necessitates a number of steps, such as an alkali treatment, washing with water, an acid treatment, a dehydrogenation treatment, and another washing with water, resulting in an increased production cost. Further, this method may reduce the corrosion resistance of the alloy to an alkaline electrolyte because it includes the acid treatment.

The treatment with the oxidizing agent is preferably conducted in succession to the washing of the alloy powder in water. Before the addition of the oxidizing agent, the pH of the water dispersing the alloy powder is preferably 7 or more. This is because a Ni-rich layer, which has been formed on the surface of the alloy powder by the alkali treatment, corrodes in a water having a pH in the acid region.

As the oxidizing agent, any oxidizing agent may be used as long as it is capable of removing hydrogen absorbed in the alloy powder without oxidizing metallic nickel formed on the surface of the alloy powder. One preferred example of the oxidizing agent is a hydrogen peroxide solution, because the reaction of hydrogen peroxide with hydrogen produces only water. It is preferable to add a hydrogen peroxide solution in a water in which the alloy powder is dispersed, while stirring.

It is preferable to use 0.5 to 15 parts by weight of hydrogen peroxide per 100 parts by weight of the alloy powder. When the amount of hydrogen peroxide is less than 0.5 part by weight, it is difficult to remove hydrogen in the alloy sufficiently. On the contrary, when the amount of hydrogen peroxide is more than 15 parts by weight, the fine particles of metallic nickel on the alloy surface are oxidized to deteriorate the reactivity of the alloy.

Next, the present invention will be illustrated concretely based on examples.

EXAMPLE 1

(i) First Step

Mm, Ni, Mn, Al and Co were mixed at a predetermined ratio, and the mixture was placed in a high frequency induction furnace to produce a hydrogen storage alloy ingot represented by $MmNi_{4.1}Mn_{0.4}Al_{0.3}Co_{0.4}$. Subsequently, the ingot was heated at 1060° C. for 10 hours in an argon atmosphere. The ingot was pulverized into coarse particles, which were then further pulverized to have a mean particle size of 75 µm or less in under a condition having water by means of a wet ball mill thereby to obtain a starting powder comprising a hydrogen storage alloy with a mean particle size of 20 µm.

Subsequently, the resultant starting powder was subjected to an alkali treatment. Specifically, the starting powder was immersed in an aqueous solution containing 20 to 80 wt % of NaOH at a temperature of 70° C. to the boiling point and stirred for one hour. Here, since the alloy powder obtained by means of a wet ball mill contained moisture, the NaOH content in the aqueous solution was adjusted to a predetermined value by taking this moisture into account.

(ii) Second Step

The powder subjected to the alkali treatment was washed with water, dehydrated, and dried to obtain an electrode alloy powder. In the washing and dehydration, the powder was mixed with warm water while stirring, followed by dehydrating under pressure. These operations were repeated until the pH of the used warm water became 9 or less.

Figure 1:
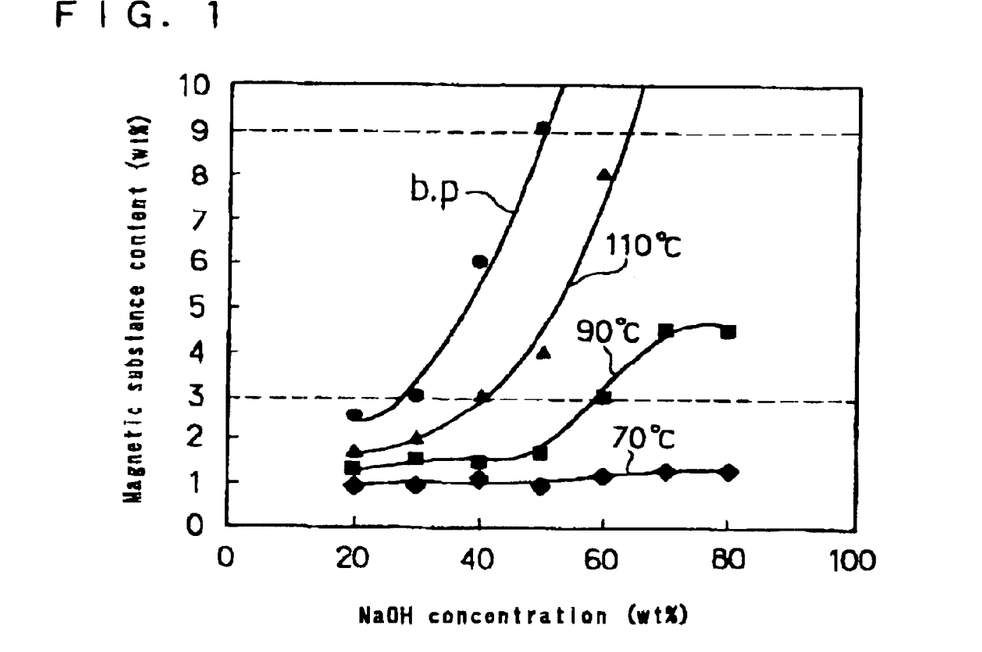
FIG. 1 is a graph showing a relation between NaOH concentration of an aqueous NaOH solution and a magnetic substance content in an electrode alloy powder obtained through an alkali treatment.

FIG. 1 shows the relation between the NaOH concentration of the aqueous NaOH solution and the magnetic substance content in the electrode alloy powder in the cases of the aqueous NaOH solutions used in the fist step having the respective temperatures of 70° C., 90° C., 110° C. and the boiling point (b.p).

Here, the magnetic substance content was measured by means of a vibrating sample magnetometer. Although the hydrogen storage alloy itself is not a magnetic substance, metallic Ni, which is the magnetic substance, is produced from the alloy through the alkali treatment. Therefore, a greater content of the magnetic substance in the alloy generally indicates that the effect of the alkali treatment is exerted to the deep part of the surface portion of the alloy powder.

Of the resultant electrode alloy powders, the powder subjected to the alkali treatment with the aqueous solution containing 50 wt % of NaOH at 110° C. in the first step was named alloy (a).

COMPARATIVE EXAMPLE 1

A starting powder comprising the same hydrogen storage alloy as the one used in Example 1 was subjected to a well-known alkali treatment. Namely, the resultant starting powder was immersed in an aqueous solution containing 50 wt % of KOH at 110° C. and stirred for 3 hours. Subsequently, the same operations as in the second step of Example 1 were conducted on the powder. The resultant powder was named alloy (b).

COMPARATIVE EXAMPLE 2

A starting powder comprising the same hydrogen storage alloy powder as the one used in Example 1 was subjected to a well-known alkali treatment and acid treatment in succession. Specifically, the resultant alloy powder was immersed in an aqueous solution containing 50 wt % of KOH at 110° C. and stirred for one hour. After the alkali treatment, the powder was washed with water and further immersed in an aqueous formic acid solution having a pH of 4.5 for 10 minutes. Subsequently, the same operations as in the second step of Example 1 were conducted on the powder until the pH of the used warm water became 6 or more. The resultant powder was named alloy (c).

The magnetic substance content was 4 wt % in each of alloys (a) to (c).

Of alloys (a) to (c), only alloy (b) was obtained through 3 hours of the alkali treatment as described above. The reason was that in case the alkali treatment was conducted to obtain alloy (b) for only one hour under the conditions of Comparative Example 1, the magnetic substance content in alloy (b) was significantly lower than those in alloys (a) and (c) obtained in Example 1 and Comparative Example 2, respectively. Such an alloy powder was considered to be inappropriate as a sample to be used in a comparison below. This also indicates that the treatment with the aqueous NaOH solution has an advantage over the treatment with the aqueous KOH solution in that it can save the time required for the alkali treatment, when the desired magnetic substance contents to be obtained in the two treatments are the same.

Next, the following evaluation was conducted on each of alloys (a) to (c).

Figure 2:
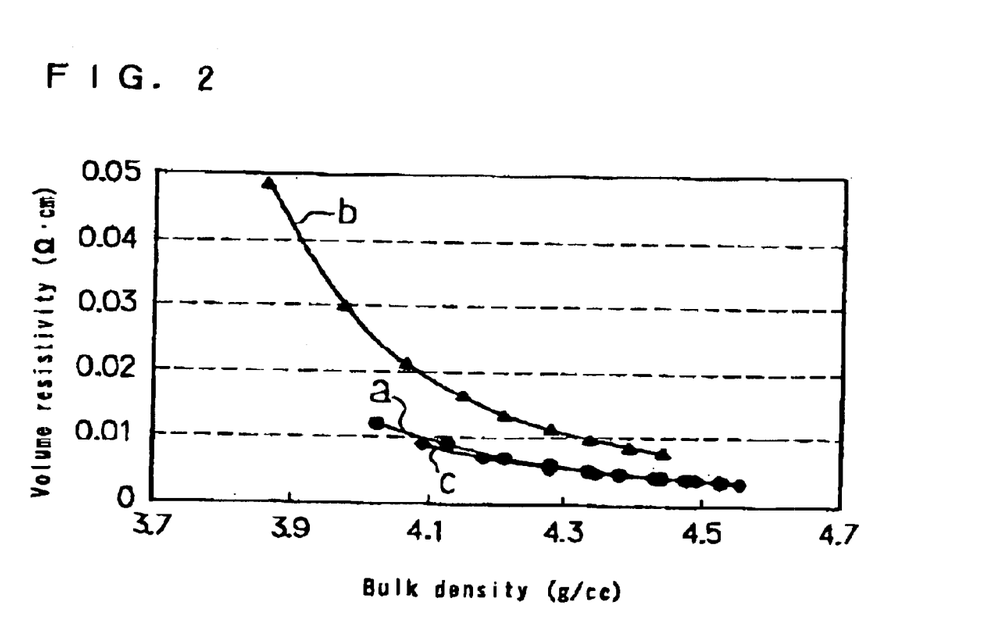
FIG. 2 is a graph showing a relation between bulk density and volume resistivity of an electrode alloy powder.

FIG. 2 shows the results of the measurement of the volume resistivity of alloys (a) to (c) using a 4-terminal measurement technique (electrode interval: 5 mm, electrode radius: 1 mm).

In this measurement, a common method of measuring a powder resistivity was adapted, in which alloys (a) to (c) used as sample powders were gradually pressurized, while the relation between the bulk density and the volume resistivity of each sample powder was examined. FIG. 2 demonstrates that each of alloys (a) and (c) has a considerably higher conductivity than alloy (b).

Figure 3:
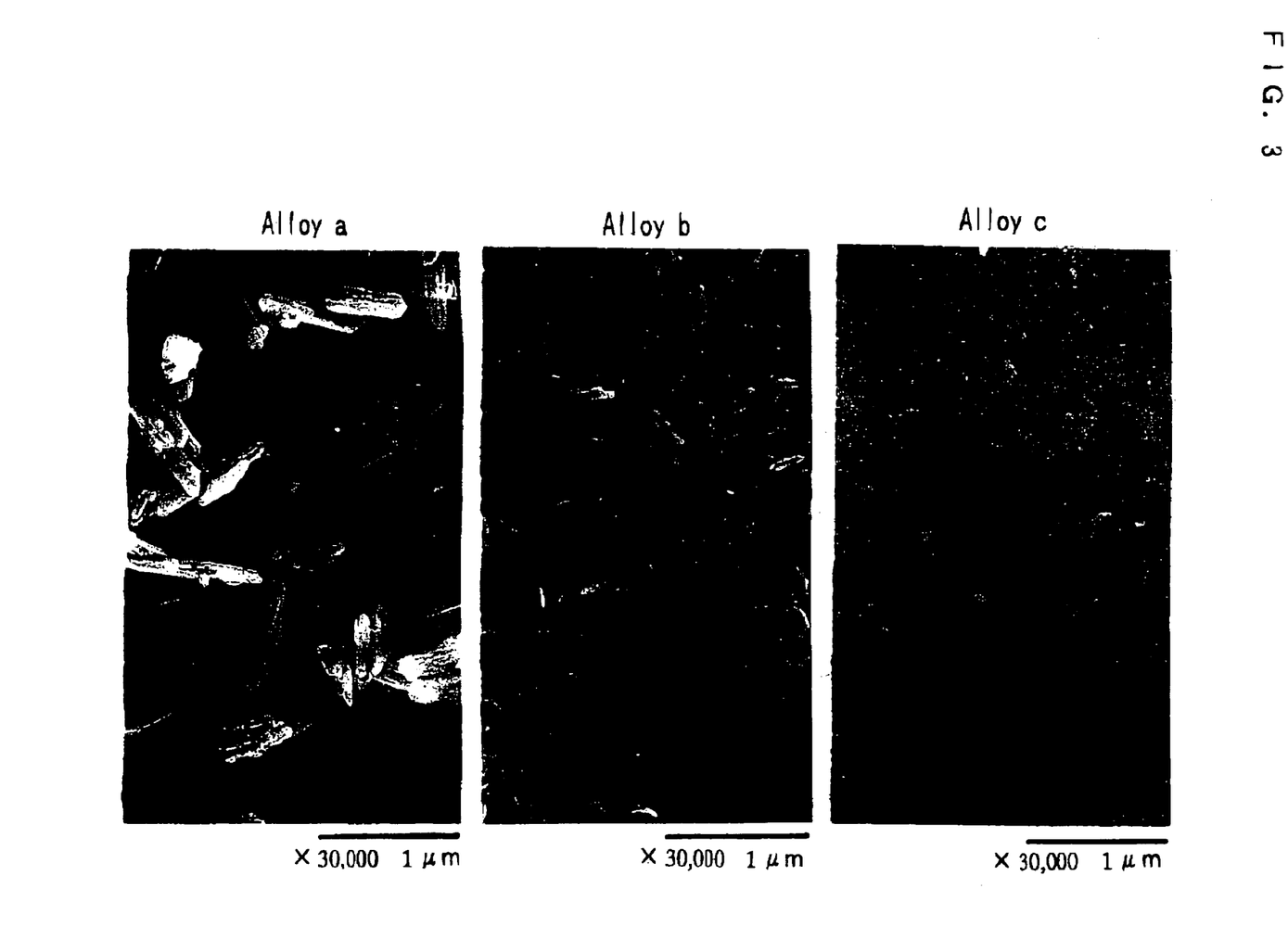
FIG. 3 shows SEM photos showing surface conditions of alloys (a), (b) and (c) obtained in Example 1, Comparative Example 1 and Comparative Example 2, respectively.

Next, FIG. 3 shows SEM photos respectively illustrating the surface conditions of alloys (a) to (c). In FIG. 3, the surface of alloy (b) is entirely covered with a scaly oxide or the like. This was considered to be the reason why alloy (b) exhibited a low conductivity. In contrast, no oxide was present on the surface of alloy (c) having a high conductivity. Additionally, although an oxide is present on the surface of alloy (a), the surface was dotted with island-like oxides, so that the conductivity of alloy (a) compared favorably with that of alloy (c) having no oxide present on the surface thereof.

Such differences in the surface conditions were considered to result from the fact that the dissolution behaviors of the constituting elements of the hydrogen storage alloy, the re-deposition rate of the dissolved elements, and the composition of the deposit in the aqueous KOH solution were different from those in the aqueous NaOH solution.

Next, the following operations were conducted in order to confirm the difference in the dissolution behaviors of the constituting elements of the hydrogen storage alloy. Firstly, supernatant liquids were collected from the respective aqueous alkaline solutions used in the alkali treatments in Example 1 and Comparative Example 1 to measure the concentration of each dissolved metallic element in the liquids. Table 1 shows the concentrations of Al, Mn and Co. Table 1 also shows the percentages by weight of Al, Mn and Co in the solution with the total weight of these elements contained in the solution taken as 100, and the percentages by weight of Al, Mn and Co in the hydrogen storage alloy with the total weight of these elements contained in the hydrogen storage alloy taken as 100.

TABLE 1

| Element | Concentration and percentage by weight of element | | |
|---|---|---|---|
| | Al | Mn | Co |
| Inside alloy | 15 wt % | 41 wt % | 44 wt % |
| Supernatant liquid of Ex. 1 | 600 µg/ml 27 wt % | 1600 µg/ml 72 wt % | 20 µg/ml 1 wt % |
| Supernatant liquid of Com. Ex. 1 | 600 µg/ml 60 wt % | 300 µg/ml 30 wt % | 100 µg/ml 10 wt % |

Table 1 shows that in the supernatant liquid of Example 1 using the aqueous NaOH solution, Al and Mn were dissolved at the ratio at which these elements were contained in the hydrogen storage alloy. In contrast, the dissolved amount of Mn was less than that of Al in the supernatant liquid of Comparative Example 1 using the aqueous KOH solution. Generally, it is considered that the ratio of the dissolved amounts of these elements is substantially the same as the content ratio of these elements in the hydrogen storage alloy. Therefore, in the alkali treatment of Comparative Example 1, Mn was considered to be dissolved into the aqueous KOH solution and then converted to an oxide or the like to be deposited on the surface of the hydrogen storage alloy. Further, since the Co content in the supernatant liquid in Example 1 using the aqueous NaOH solution was less than that in Comparative Example 1, it was considered that the use of the aqueous NaOH solution can cause a greater amount of Co to be present on the surface of the hydrogen storage alloy than the use of the aqueous KOH solution.

As described above, the production method of the present invention proved to be advantageous in that the resultant alloy (a) had conductivity as high as that of alloy (c), and it was not necessary to conduct the alkali treatment and the acid treatment in combination in contrast with the production method of alloy (c). Further, the production method of the present invention using an aqueous NaOH solution for the alkali treatment is more advantageous than a conventional production method using an aqueous KOH solution for the same, because the cost required for the reagent in the former is about a half of that required in the later.

Next, an electrode including the electrode alloy powder obtained in Example 1 was evaluated for the performance thereof.

To 100 parts by weight of a predetermined electrode alloy powder, 0.15 part by weight of carboxymethyl cellulose, 0.3 part by weight of carbon black and 0.7 part by weight of a styrene-butadiene copolymer were added, and the mixture was kneaded with water to obtain a paste. The paste thus obtained was applied onto a punched metal sheet, which was dried, roll-pressed to a predetermined thickness and cut into a predetermined size thereby to produce a negative electrode.

A single sheet of the negative electrode thus obtained was sandwiched between two sheets of a Ni positive electrode having a known foamed core material, each of which had a greater theoretical capacity than the negative electrode, with a nonwoven fabric separator made of sulfonated polypropylene interposed therebetween, thereby obtaining an electrode group. Then, an open type battery rich in electrolyte was produced by using the electrode group and an aqueous KOH solution having a specific gravity of 1.30 g/cc as the electrolyte. The capacity of the negative electrode was approximately 900 mAh and the capacity of this battery was restricted by the negative electrode. As the reference electrode for the battery, an Hg/HgO electrode was used.

The battery thus obtained was charged at 25° C. at a 10-hour rate (0.1 C) for 15 hours, and then discharged at a 5-hour rate (0.2 C) until the potential of the negative electrode became −0.6 V versus the reference electrode. Thereafter, the battery was charged again at a 10-hour rate for 15 hours.

Figure 4:
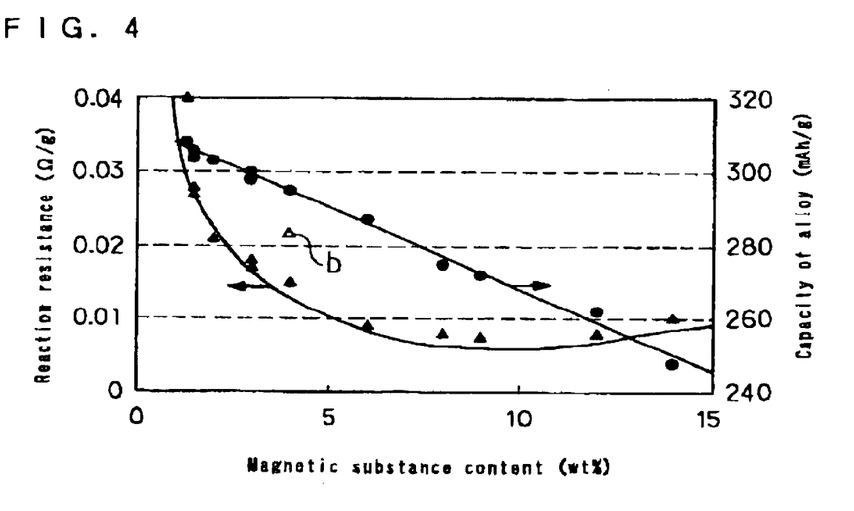
FIG. 4 is a graph showing a relation between a magnetic substance content in an electrode alloy powder obtained through the first and second steps, and each of reaction resistance of an electrode containing the electrode alloy powder and capacity of the alloy powder.

In order to observe the condition of the negative electrode of this battery, AC impedance measurement was conducted at 25° C. by using the negative electrode as the working electrode, the positive electrode as the counter electrode and the Hg/HgO electrode as the reference electrode. FIG. 4 shows the relation between the magnetic substance content in the electrode alloy powder and the reaction resistance per unit weight of the alloy powder.

The reaction resistance value was determined from the size of an arc on the complex plane plot, i.e., the Cole-Cole plot, of the results of the AC impedance measurement. The reaction resistance value indicates the level of the activity of the negative electrode. The smaller the reaction resistance value of the electrode is, the higher the activity thereof is and the more excellent the high-rate discharge property thereof is.

Next, the same battery was charged at 25° C. at a 10-hour rate for 15 hours, and then discharged at a 5-hour rate until the potential of the negative electrode became −0.6 V versus the reference electrode. This charge/discharge cycle was repeated for 10 times. FIG. 4 shows the relation between the magnetic substance content in the electrode alloy powder and the capacity per unit weight of the electrode alloy powder at the 10th cycle.

FIG. 4 indicates that the reaction resistance value decreased with an increase in the magnetic substance content, became approximately constant when the magnetic substance content exceeded 9 wt % and gradually increased thereafter. This result demonstrated that although the increase of the magnetic substance content on the surface of the electrode alloy powder improved the activity of the negative electrode, it did no longer improve the activity once it reached a certain amount.

Another open type battery was fabricated in the same manner as above, except for the use of alloy (b) obtained in Comparative Example 1 and the battery thus obtained was similarly evaluated. As a result, the reaction resistance value of the battery was greater than that of the battery using alloy (a), whose magnetic substance content was also 4 wt %. This was presumably because the oxide deposited on the surface of alloy (b) inhibited the electrode reaction.

On the other hand, FIG. 4 shows that the capacity per unit weight of the electrode alloy powder linearly decreases with an increase in the amount of the magnetic substance. This was probably because the increase in the amount of Ni and Co having ferromagnetism, each of which functioned as the catalyst in the electrode reaction, was accompanied by the dissolution of other constituting elements such as Mm, Al and Mn, whereby the parent phase of the hydrogen storage alloy was decreased to reduce the capacity for hydrogen storage.

In view of the fact that the magnetic substance exceeding 9 wt % caused little change in the reaction resistance, the magnetic substance content was preferably 9 wt % or less in order to minimize the decrease in the capacity of the electrode alloy powder.

Next, AA-size sealed nickel-metal hydride storage batteries were fabricated by using the electrode alloy powders respectively obtained in Example 1 and Comparative Examples 1 and 2 to evaluate the high-rate discharge property at low temperatures, self-discharge property and cycle life thereof.

First, to 100 parts by weight of each of the predetermined electrode alloy powders, 0.15 part by weight of carboxymethyl cellulose, 0.3 part by weight of carbon black and 0.7 part by weight of a styrene-butadiene copolymer were added, and the mixture was kneaded by further adding water therewith to obtain a paste. The paste thus obtained was applied onto a punched metal sheet, dried, roll-pressed to a predetermined thickness, and then cut into a predetermined size to produce a negative electrode.

The negative electrode thus produced and a Ni positive electrode having a known foamed core material were laminated, with a nonwoven fabric separator made of sulfonated polypropylene interposed therebetween, and rolled up in a spiral fashion to obtain a cylindrical electrode group. The electrode group thus obtained was inserted into a metal case. Subsequently, an aqueous alkaline solution containing mainly KOH having a specific gravity of 1.30 g/cc as the electrolyte was injected into the metal case, which was then sealed to obtain a known AA-size sealed nickel-metal hydride storage battery. The battery thus obtained had a capacity of approximately 1.2 Ah.

Each of the obtained battery was charged at 25° C. at a 10-hour rate for 15 hours, and then discharged at a 5-hour rate until the battery voltage dropped to 1 V. The discharge capacity obtained here was named C1.

High-Rate Discharge Property at Low Temperatures

Each of the batteries obtained was charged at 25° C. at a 10-hour rate for 15 hours, and then discharged at 25° C. at a current of 3.6 A until the battery voltage dropped to 0.6 V. The discharge capacity obtained at this time was named C2. Next, each battery was charged at 25° C. at a 10-hour rate for 15 hours, and then discharged at −10° C. at a current of 3.6 A until the battery voltage dropped to 0.6 V. The discharge capacity obtained at this time was named C2'.

The capacity ratio of each battery was determined by the following equation:

Capacity ratio (%)=(C2'/C2)×100

The results are shown in Table 2.

TABLE 2

|  | Magnetic substance content (wt %) | High-rate discharge property at low temperature (%) | Self-discharge property (%) | Cycle life (number) |
| --- | --- | --- | --- | --- |
| Ex. 1 | 2 | 9 | 65 | 420 |
|  | 3 | 80 | 71 | 500 |
|  | 4 | 83 | 75 | 540 |
|  | 6 | 84 | 75 | 540 |
|  | 8 | 83 | 75 | 520 |
|  | 9 | 81 | 73 | 500 |
|  | 12 | 80 | 70 | 400 |
| Com. Ex. 1 | 4 | 9 | 70 | 380 |
| Com. Ex. 2 | 4 | 80 | 55 | 380 |

Figure 5:
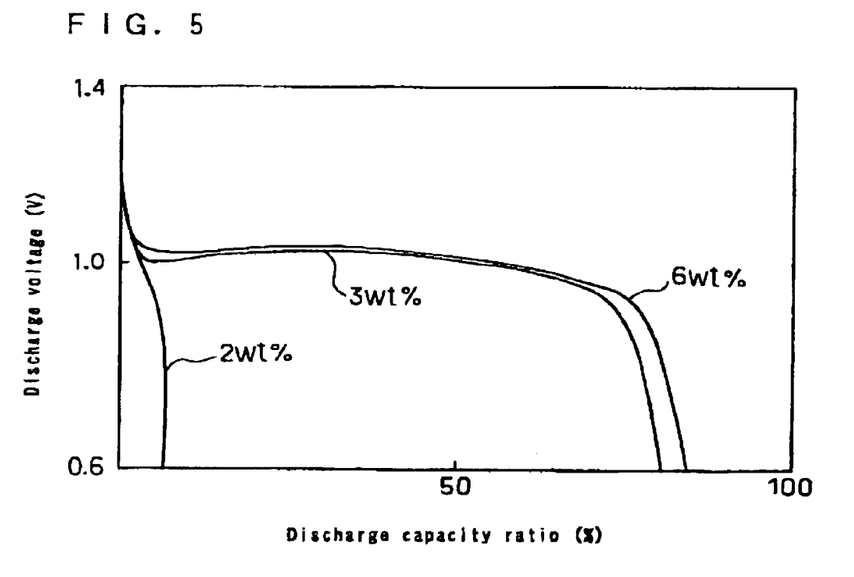
FIG. 5 is a graph showing a relation between a magnetic substance content of an electrode alloy powder and each of a discharge voltage and a discharge capacity ratio of a battery using the electrode alloy powder.

FIG. 5 shows the relation between the discharge voltage and the discharge capacity ratio ((C2'/C2)×100) in the case where the batteries using the electrode alloy powders having the respective magnetic substance contents of 2 wt %, 3 wt % and 6 wt %, out of the electrode alloy powders obtained in Example 1, were discharged at −10° C. at a current of 3.6 A.

FIG. 5 indicates that each of the batteries using the electrode alloy powders with a magnetic substance content of 3 wt % or more exhibits a good discharge curve at low temperatures. This was considered to be due to the reduced reaction resistance of the negative electrode. On the contrary, the battery using the electrode alloy powder with a magnetic substance content of 2 wt % was almost unable to be discharged at low temperatures. The reason was considered that the amount of metallic Ni formed on the surface of the electrode alloy powder was not large enough to impart a sufficient reactivity to the surface of the alloy powder, resulting in a great reaction resistance. The above results demonstrate that the magnetic substance content in the electrode alloy powder is preferably 3 wt % or more.

On the other hand, in Table 2, the battery using alloy (b) obtained in Comparative Example 1 was unable to be discharged at low temperatures, although the magnetic substance content thereof was 4 wt %. The reason was presumably that the oxide deposited on the surface of the alloy powder reduced the conductivity of the alloy powder and inhibited the catalytic function of the Ni-rich layer, thereby increasing the reaction resistance.

Self-Discharge Property

After evaluating the high-rate discharge property at low temperatures, each battery charged at 25° C. at a 10-hour rate for 15 hours was allowed to stand at 45° C. for one week. Subsequently, the remaining capacity C3 was measured and the self-discharge rate was determined by the following equation:

Self-discharge rate (%)=(C3/C1)×100

The results are shown in Table 2.

The battery using alloy (c) exhibited the poorest self-discharge property. The reason seemed to be that the alloy powder subjected to only the alkali treatment and the alloy powder subjected to the acid treatment after the alkali treatment differed from each other in the dissolution behaviors of the constituting elements of the hydrogen storage alloy in the alkaline electrolyte. Further, the reason why the battery using alloy (b) exhibited a relatively favorable result was probably attributable to the influence of the oxide or hydroxide present on the surface of the alloy powder. In other words, the presence of an oxide or hydroxide of La, Mn, Co or the like on the surface of the alloy powder was considered to prevent the constituting elements of the hydrogen storage alloy from being further dissolved into the electrolyte.

Cycle Life

After evaluating the high-rate discharge property at low temperatures, each battery was charged at a 10-hour rate for 12 hours, and then discharged at a 5-hour rate until the battery voltage dropped to 1 V. This cycle was repeated to determine the cycle life. In Table 2, the cycle life of each battery is indicated as the number of cycles at the end of which the discharge capacity decreases to 60% of C1 or smaller.

The results of the cycle life listed in Table 2 demonstrated that the batteries using the electrode alloy powders of Example 1 having a magnetic substance content of 3 to 9 wt % exhibited a particularly excellent cycle life. The battery using alloy (b) of Comparative Example 1 exhibited a short cycle life, probably because the oxide covering the surface of the alloy powder reduced the activity of the alloy powder to promote depletion of the electrolyte due to an increase in the internal pressure of the battery or the like.

However, of the alloy powders obtained in Example 1, the one having a magnetic substance content of less than 3 wt % had a short cycle life. This was probably because the reduced activity on the surface of the alloy powder promoted the depletion of the electrolyte due to an increase in the internal pressure of the battery or the like.

The battery using alloy (c) of Comparative Example 2 also had a short cycle life. This was presumably because, since alloy (c) had been subjected to the acid treatment after the alkali treatment, a greater amount of the constituting elements of the hydrogen storage alloy were dissolved into the alkaline electrolyte and were re-deposited to decrease the amount of the electrolyte.

As discussed above, the use of an aqueous NaOH solution for an alkali treatment can more successfully prevent an oxide to be deposited on the surface of the alloy powder than the use of an aqueous KOH solution, so that the resultant alloy has a decreased contact resistance and improved reactivity. Furthermore, both the cost and time required for the alkali treatment can be saved.

In addition, of the electrode alloy powders subjected to the alkali treatment with the aqueous NaOH solution, those having a magnetic substance content of 3 to 9 wt % yielded a battery of excellent performance.

From the above, the method of producing an electrode alloy powder in accordance with the present invention is clearly superior to conventional production methods such as the ones using an aqueous KOH solution or using the alkali treatment and the acid treatment in combination.

When the aqueous NaOH solution having an NaOH concentration of less than 30 wt % was used for the alkali treatment, the magnetic substance content in the electrode alloy powder did not become 3 wt % or more by immersing the powder for about one hour, even when the temperature of the solution was raised to the boiling temperature. Also, in the case of the aqueous NaOH solution at, for example, 100° C., the upper limit for the NaOH concentration thereof was 80 wt %, and NaOH was not completely dissolved in the solution when the concentration was increased further. Therefore, the alkali treatment cannot be further promoted by increasing the NaOH concentration in the aqueous solution to over 80 wt %.

In the case of the aqueous NaOH solution at a temperature lower than 90° C., a considerably long time was required for the immersion in order to attain a magnetic substance content of 3 wt % ore more, no matter how high the NaOH concentration of the solution was. This was disadvantageous in terms of the production cost. Therefore, the temperature of the aqueous NaOH solution is preferably not lower than 90° C. and not higher than the boiling point.

In summary, the alkali treatment using an aqueous NaOH solution of a high concentration at a high temperature as in the present invention can more successfully decrease the surface area of the hydrogen storage alloy powder covered with an oxide or the like than a conventional alkali treatment using an aqueous KOH solution. The SEM photo of alloy (a) shows that a considerable portion of the surface of alloy (a) is exposed, not being covered with the deposit of an oxide or hydroxide. Since much of the Ni-rich layer on the surface of the alloy powder was exposed, the Ni was able to exert its catalytic effect, thereby decreasing the reaction resistance as well as the contact resistance of alloy (a). As a result, it was possible to provide a battery of an excellent high-rate discharge property and cycle life.

The present invention is more advantageous than a conventional production method using an aqueous KOH solution in terms of productivity, and it can form an Ni-rich layer on the surface of the electrode alloy powder within a short time. The present invention is much more advantageous than another conventional production method using an alkali treatment and an acid treatment in combination, because it does not require the acid treatment. Since the inside of the battery is in an alkaline condition, dissolution of the constituting elements of the hydrogen storage alloy into the electrolyte can be more successfully suppressed in an electrode alloy powder obtained by the production method of the present invention, as compared with the one obtained by the acid treatment. Accordingly, the present invention can provide a battery exhibiting an excellent self-discharge property and cycle life.

EXAMPLE 2

The same operations as in Example 1 were conducted on a starting powder comprising the same hydrogen storage alloy as in Example 1, except that the starting powder was immersed in aqueous solutions of NaOH or KOH having the respective concentrations and temperatures listed in Table 3 for the respective times listed in Table 3 to obtain electrode alloy powders. Then, the magnetic substance content in each of the resultant electrode alloy powders was measured in the same manner as in Example 1. The results are shown in Table 3.

TABLE 3

| Alkali | Concentration (wt %) | Temperature (° C.) | Time (hr) | Magnetic substance content (wt %) |
|---|---|---|---|---|
| NaOH | 30 | 90 | 1 | 1.5 |
|  |  |  | 2 | 2.3 |
|  |  |  | 3 | 3 |
|  | 40 | 110 | 1 | 3 |
|  |  |  | 2 | 4.5 |
|  |  |  | 3 | 6 |
|  | 80 | boiling point | 0.1 | 1.8 |
|  |  |  | 0.2 | 3 |
| KOH | 40 | 110 | 1 | 2 |
|  |  |  | 2 | 2.4 |
|  |  |  | 3 | 2.8 |

As shown in Table 3, the magnetic substance content simply increased with an increase in the immersing time, when measured under a constant condition. Therefore, a magnetic substance content of 3 wt % or more can be achieved by immersing the powder comprising a hydrogen storage alloy in an aqueous NaOH solution of a low concentration at a high temperature for a long time, for example, about 10 hours. However, such a long immersing time is very disadvantageous in terms of productivity. Since Table 3 shows that it takes 3 hours to achieve a magnetic substance content of 3 wt % in the case of using the aqueous solution containing 30 wt % of NaOH at 90° C., the immersing time is preferably not longer than 3 hours. On the other hand, in the case of using the aqueous solution containing 80 wt % of NaOH at the boiling point, it took 0.2 hour to achieve a magnetic substance content of 3 wt %. Accordingly, the immersing time is preferably not shorter than 0.2 hour, although it is preferred that the immersing time is as short as possible.

Table 3 indicates that the use of the aqueous solution containing 40 wt % of KOH at 110° C. requires a remarkably longer time in order to achieve the same magnetic substance content, as compared with the use of the aqueous NaOH solution containing 40 wt % of NaOH at the same temperature. The reason is presumably that the alkali treatment with an aqueous KOH solution causes a scaly oxide to cover the surface of the alloy powder as shown in FIG. 3, resulting in an insufficient effect of the alkali treatment. These results demonstrate that the production method of an electrode alloy powder using an aqueous KOH solution and the production method using an aqueous NaOH solution significantly differ from each other in terms of productivity.

EXAMPLE 3

Reduction of the Co content in an $AB_5$ type hydrogen storage alloy tends to accelerate the corrosion of the hydrogen storage alloy thereby to shorten the cycle life of the resultant battery. Nevertheless, the reduction of Co usage is desired because Co is a highly expensive metal.

In Example 1, it was indicated that the use of an aqueous NaOH solution could cause a greater amount of Co or a Co compound to be present on the surface of the hydrogen storage alloy, as compared with the use of a KOH solution. In an electrode alloy powder in such a state, there was the possibility that the corrosion resistance of the parent phase in the hydrogen storage alloy inside the battery has been improved.

In order to confirm this effect of the present invention, the Co content in the hydrogen storage alloy used in Example 1 was reduced from 5.5 wt % to 2.7 wt %. Here, a hydrogen storage alloy represented by $MmNi_{4.0}Mn_{0.5}Al_{0.3}Cu_{0.3}Co_{0.2}$ was used. Sealed batteries were fabricated in the same manner as in Example 1, except that the above hydrogen storage alloy was immersed in an aqueous solution containing 50 wt % of NaOH at 110° C. for one hour, or alternatively, in an aqueous solution containing 50 wt % of KOH at 110° C. for 3 hours, in the alkali treatment. Then, each battery thus obtained was measured for the cycle life. The results are shown in Table 4.

TABLE 4

| Co content (wt %) | | 5.5 | 2.7 |
|---|---|---|---|
| Cycle life | NaOH | 520 | 400 |
| (number) | KOH | 380 | 180 |

The results shown in Table 4 indicate that although a reduced Co content in the hydrogen storage alloy powder shortens the cycle life of the resultant battery, this disadvantage can be alleviated by using the aqueous NaOH solution for the alkali treatment. In other words, the production method of the present invention can provide an electrode alloy powder capable of yielding a battery having a cycle life equal to or longer than a conventional battery, even when the Co content in a hydrogen storage alloy as the starting material is reduced to less than that in conventional batteries.

EXAMPLE 4

The effect of an alkali treatment is influenced by the surface condition of an untreated hydrogen storage alloy. Usually, a thin film of oxide is formed on the surface of an untreated hydrogen storage alloy. Therefore, study was conducted on the oxygen content in the hydrogen storage alloy as the starting powder as well as the moisture contained in the hydrogen storage alloy.

First, the influence of the oxygen content was investigated. Mm, Ni, Mn, Al and Co were mixed at a predetermined ratio and the mixture was placed in a high frequency induction furnace to produce a hydrogen storage alloy ingot represented by $MmNi_{4.1}Mn_{0.4}Al_{0.3}Co_{0.4}$. Subsequently, the ingot thus obtained was heated at 1060° C. for 10 hours in an argon atmosphere. The ingot was pulverized into coarse particles, which were then further pulverized to have a particle size of 75 μm or less in a dry ball mill in which the oxygen concentration of the atmosphere was controlled, thereby giving hydrogen storage alloy powders having a mean particle size of 20 μm and a varied oxygen content.

To 100 parts by weight of the alloy powder, 10 parts by weight of water was added to moisten the alloy powder, and the powder was then immersed in an aqueous solution containing 50 wt % of NaOH or KOH at 110° C. for one hour, washed with water, dehydrated and dried. In the washing and dehydration, the alloy powder was mixed with warm water while stirring, followed by dehydrating under pressure. These operations were repeated until the pH of the used warm water became 9 or below.

Prior to the alkali treatment with the aqueous NaOH solution, the oxygen content in the alloy powder in a dried state was measured. The oxygen content was determined by heating the weighed alloy powder at a high temperature in a carbon crucible and measuring the amount of $CO_2$ generated during the heating. Table 5 shows the relation between the oxygen content thus obtained and the magnetic substance content in the electrode alloy powder after the alkali treatment.

TABLE 5

| Oxygen content (wt %) | | 0.3 | 0.5 | 1.0 | 1.5 |
|---|---|---|---|---|---|
| Magnetic substance content | NaOH | 3.8 | 3.8 | 3.7 | 2.2 |
| (wt %) | KOH | 2.5 | 2.5 | 2.4 | 2.3 |

The results shown in Table 5 indicate that the effect of the treatment with the aqueous NaOH solution rapidly decreases when the oxygen content exceeds 1 wt % in the case of the alloy powder having a mean particle size of 20 μm. In other words, in the case of the alloy powder having a high oxygen content, a thick film of an oxide or hydroxide was considered to be formed on the surface thereof. This film was believed to hinder the effect of the alkali treatment, even when the aqueous NaOH solution at a high temperature having a high concentration was used.

In the treatment using the aqueous KOH solution, the effect of the alkali treatment was not remarkably decreased even when the oxygen content was increased, in contrast with the treatment using the aqueous NaOH solution. This was probably because the immersion in the aqueous KOH solution itself caused the formation of a film of an oxide or the like on the alloy powder surface as shown in FIG. 3.

As discussed above, the performance of an electrode alloy powder remarkably varied depending upon the level of oxidation on the surface of the alloy powder before the alkali treatment, even when the conditions for the alkali treatment were kept constant. Therefore, it is particularly desirable to prevent the alloy powder before the alkali treatment from being exposed to an oxidizing atmosphere in the production method of the present invention using an aqueous NaOH solution, in contrast with a conventional method using an aqueous KOH solution.

Next, the influence of moisture contained in the hydrogen storage alloy powder was investigated. The amount of moisture was considered to have an influence on the wettability of the alloy powder by the aqueous alkaline solution.

Mm, Ni, Mn, Al and Co were mixed at a predetermined ratio and the mixture was placed in a high frequency induction furnace to produce a hydrogen storage alloy ingot represented by $MmNi_{4.1}Mn_{0.4}Al_{0.3}Co_{0.4}$. Subsequently, the ingot thus obtained was heated at 1060° C. for 10 hours in an argon atmosphere. The ingot was pulverized into coarse particles, which were then further pulverized to have a particle size of 75 μm or less in a wet ball mill to give a hydrogen storage alloy powder having a mean particle size of 20 μm.

The alloy powder thus obtained was placed in the following different states: a moistened state; a fully-dried state; and a state in which the alloy powder was fully-dried and then added with 10 parts by weight of water per 100 parts by weight of the alloy powder. Thereafter, the alloy powders in the respective states were immersed in an aqueous solution containing 50 wt % of NaOH at 110° C. for one hour, washed with water, dehydrated and dried. Here, in the case of the alloy powder in a moistened state, the NaOH concentration of the aqueous solution was adjusted by taking the moisture contained in the alloy powder into account. In the washing and dehydration, each alloy powder was mixed with warm water while stirring, followed by dehydrating under pressure. These operations were repeated until the pH of the used warm water became 9 or below. The magnetic substance contents in the respective electrode alloy powders thus obtained are shown in Table 6.

TABLE 6

| Surface condition of alloy | Magnetic substance content (wt %) |
| --- | --- |
| Moistened state | 4 |
| Fully-dried state | 2.2 |
| Added with water, after fully-dried | 3.7 |

As shown in the results listed in Table 6, the effect of the alkali treatment was sufficiently improved when using the alloy powder in a moistened state, whereas it was not sufficiently improved when using the alloy powder in a fully-dried state. Moreover, when using the alloy powder in a state in which it was fully-dried and then added with water before the alkali treatment, the effect of the alkali treatment was improved to a satisfactory level. Such a result was obtained probably because a film of an oxide or the like was instantaneously formed on the surface of the alloy powder, if the surface was in a dried state when the alloy powder was added into a aqueous alkaline solution at a high temperature, thereby decreasing the effect of the alkali treatment.

Although the alloy powder which had been pulverized in a wet ball mill was used in this example, a similar tendency was observed when using an alloy powder which had been pulverized in a dry ball mill.

As is shown above, it is extremely important to moisten the alloy powder prior to an alkali treatment with an aqueous NaOH solution, in order to produce a sufficient amount of a magnetic substance on the surface of an alloy powder thereby to shorten the immersing time.

EXAMPLE 5

In this Example, the effect of the washing step after the alkali treatment was investigated.

First, a starting powder comprising the same hydrogen storage alloy as the one used in Example 1 was prepared. The powder was immersed in an aqueous solution containing 50 wt % of NaOH at 110° C. for one hour, washed with water, dehydrated and dried. In the washing and dehydration, the alloy powder was mixed with warm water while stirring, followed by dehydrating under pressure. These operations were repeated until the pH of the used warm water became 9 or less, or until it became 11.

By using each of the electrode alloy powders thus obtained, an open-type battery similar to that of Example 1 was fabricated, respectively. The negative electrode capacity was approximately 900 mAh and the capacity of this battery was restricted by the negative electrode.

The battery thus obtained was charged at 25° C. at a 10-hour rate for 15 hours, and then discharged at a 5-hour rate until the potential of the negative electrode became −0.6 V versus the reference electrode. This cycle was repeated to determine the discharge capacity at the 10th cycle. The result is shown in Table 7.

TABLE 7

| pH of warm water | Magnetic substance content (wt %) | Discharge capacity (mAh/g) |
| --- | --- | --- |
| 9 or below | 4 | 295 |
| 11 | 3.8 | 275 |

As shown in Table 7, the capacity of the electrode alloy powder was small when the washing was not conducted sufficiently. This was presumably because the oxide or hydroxide deposited on the surface of the alloy powder was not sufficiently removed during the washing step. This could also be inferred from the fact that the supernatant liquid of the warm water was rapidly suspended when the pH of the warm water became 9 or below by conducting the washing of the alloy powder further. X-ray diffraction analysis of the precipitation contained in the suspended solution indicated that the precipitation contained a hydroxide of Mm.

EXAMPLE 6

Next, the production method of an electrode alloy powder further including the third step was investigated.

(i) First Step

A starting powder comprising the same hydrogen storage alloy as the one used in Example 1 was immersed in an aqueous solution containing 50 wt % of NaOH at 110° C. for one hour, while stirring. Here, since the alloy powder obtained by means of a wet ball mill contained moisture, the NaOH concentration of the aqueous solution was adjusted to 50 wt % taking the moisture into account.

(ii) Second Step

After the alkali treatment, the powder was subjected to a washing step. In the washing step, the powder was washed with warm water while stirring and the supernatant liquid was disposed of. These operations were repeated until the pH of the supernatant liquid became 10.

(iii) Third Step

To the powder which was being stirred in the water, a hydrogen peroxide solution having a concentration of 4 wt % was slowly added such that the weight ratio of hydrogen peroxide to the alloy powder became as listed in Table 8. Thereafter, the dehydration under pressure and washing with water were repeated until the pH of the supernatant liquid became 9 or below. Then the alloy powders subjected to the washing were dried to give alloys (d) to (h).

EXAMPLE 7

Alloy (i) was obtained in the same manner as in Example 1, except for the use of 0.1 M aqueous potassium permanganate solution in the third step in place of the hydrogen peroxide solution. The amount of potassium permanganate was adjusted to 3 wt % to the amount of the alloy powder.

EXAMPLE 8

Alloy (j) was obtained in the same manner as in Example 6, except that the use of the oxidizing agent was omitted in the third step.

COMPARATIVE EXAMPLE 3

A starting powder comprising the same hydrogen storage alloy as the one used in Example 1 was subjected to the combination of an alkali treatment and acid treatment and the dehydrogenation treatment in the manner described in the specification of Japanese Patent Application No. hei 10-332399. More specifically, the alloy powder obtained was immersed in an aqueous KOH solution having a specific gravity of 1.30 at 80° C., and stirred for one hour. After the alkali treatment, the powder was washed with water until the pH of the used water became 10 or less, and then immersed in an aqueous acetic acid solution having a pH of 3.0 at 60° C. for 20 minutes, while stirring. Subsequently, while being continuously stirred, the aqueous acetic acid solution was added with a hydrogen peroxide solution having a concentration of 10 wt % until the amount of hydrogen peroxide became 1.5 wt % to the amount of the alloy powder. Thereafter, the powder was washed with water, and finally, the pH of the used washing water was adjusted to 12 using KOH. Then, the powder was separated by dehydration under pressure and then dried to give alloy (k).

COMPARATIVE EXAMPLE 4

Alloy (1) was obtained in the same manner as in Comparative Example 3 by using a starting powder comprising the same hydrogen storage alloy as the one used in Example 1, except that the starting powder was treated with an aqueous solution containing 50 wt % of KOH at 110° C. in place of an aqueous KOH solution having a specific gravity of 1.30 at 80° C.

Table 8 shows the temperatures of the alloy powders of Examples 6 to 8 and Comparative Examples 3 to 4 during the dehydration under pressure in the third step. Here, all the alloy powders had a temperature of 35° C. before the dehydration under pressure. In Table 8, "○" indicates that there was no change in the temperature of the alloy powder. The temperature of each alloy powder was measured by placing a thermometer into the powder during the dehydration under pressure.

TABLE 8

| Alloy | Amount of oxidizing agent (wt %; per alloy) | Alloy temperature (° C.) | Magnetic substance content (wt %) | High-rate discharge property (%) | Cycle life (Number) |
|---|---|---|---|---|---|
| d | 0.2 | 50 | 4.0 | 84 | 520 |
| e | 0.5 | ○ | 4.1 | 86 | 560 |
| f | 3 | ○ | 4.0 | 85 | 580 |
| g | 15 | ○ | 3.9 | 84 | 540 |
| h | 20 | ○ | 3.0 | 76 | 480 |
| i | 3 (KMnO$_4$) | ○ | 3.8 | 81 | 540 |
| j | 0 | 65 | 4.0 | 80 | 480 |
| k | 1.5 | ○ | 3.0 | 76 | 300 |
| l | 3 | ○ | 4.0 | 84 | 340 |

Table 8 also shows the magnetic substance content in each alloy powder which was dried after the dehydration under pressure. Here, the magnetic substance content was also measured by means of a vibrating sample magnetometer.

Next, sealed nickel-metal hydride storage batteries were fabricated by using alloys (d) to (1) obtained in Examples 6 to 8 and Comparative Examples 3 to 4 in the same manner as in Example 1 to evaluate the high-rate discharge property and cycle life thereof.

High-Rate Discharge Property

Each of the batteries thus obtained was charged at 25° C. at a 10-hour rate for 15 hours, and then discharged at a 5-hour rate until the battery voltage dropped to 1 V. The discharge capacity obtained at this time was named C4.

Next, each battery was charged at 25° C. at a 10-hour rate for 15 hours, and then discharged at a current of 2.4 A until the battery voltage dropped to 0.6 V. The discharge capacity obtained at this time was named C5.

The capacity ratio of each battery was determined by the following equation:

Capacity ratio (%)=(C5/C4)×100

The results are show in Table 8.

Cycle Life

Each battery was charged at a 5-hour rate for 5.5 hours, and then discharged at a 5-hour rate until the battery voltage dropped to 1 V. This cycle was repeated to measure the cycle life. In Table 8, the cycle life of each battery is indicated as the number of cycles at the end of which the discharge capacity decreases to 60% of C4 or smaller.

As is shown in Table 8, the temperature of alloy (j) of Example 8, which does not use hydrogen peroxide, is 65° C. Further, the alloy powder generated so much heat that it steamed during the dehydration under pressure. Since there was little difference between the magnetic substance content in alloy (j), which generated heat, and those in alloys (e) to (g), which did not generate heat, it was believed that heat generation was not due to the oxidation reaction of metallic nickel on the surface of the alloy powder. Instead, it was considered that the heat generation was due to the following phenomenon which occurred during the alkali treatment: the alloy powder absorbed hydrogen, which had been generated during the dissolution of the constituting elements of each alloy into the aqueous alkaline solution, and the absorbed hydrogen was exposed to the atmosphere during the dehydration under pressure to be oxidized by oxygen in the atmosphere, thereby generating a reaction heat. Such phenomenon is undesirable from the viewpoint of safety. In particular, it may cause a serious problem when treating a large amount of alloy powders.

In contrast, it was found that the use of hydrogen peroxide was effective in suppressing heat generation. Especially, the use of 0.5 wt % or more of hydrogen peroxide to the amount of the alloy powder proved to be highly effective in suppressing heat generation during the dehydration under pressure. On the contrary, the use of more than 20 parts by weight of hydrogen peroxide induced a decrease in the magnetic substance content. The reason was probably that the addition of excessive amount of hydrogen peroxide caused the oxidation of Ni, which had been formed on the surface of the alloy powder. Since the use of 15 wt % of hydrogen peroxide did not lead to a decrease in the magnetic substance content, it was found that the amount of the hydrogen peroxide was preferably 0.5 to 15 wt % to the amount of the alloy powder.

The use of potassium permanganate also proved to be effective in suppressing heat generation. Accordingly, it is proved to be effective to use an adequate amount of an oxidizing agent which has a moderate oxidizing ability such that it dose not oxidize metallic Ni on the surface of the alloy powder, in order to suppress heat generation.

Next, the high-rate discharge property and cycle life of each battery were investigated. With respect to the cycle life, it is preferred that 60% of the initial capacity is maintained at the 500th cycle.

When each of alloys (e) to (g) and (i) was compared with alloy (j), it was found that alloys (e) to (g) and (i) had a great advantage of suppressing heat generation during the production process and yielding a superior high-rate discharge property and cycle life as compared with alloy (j). This was presumably attributed to the difference in the oxidation levels inside these alloy powders. That is, heat generation occurred in alloy (j) of Example 8 to promote the oxidation and corrosion of the alloy powder inside the nickel layer on the surface, in the atmosphere, thereby decreasing the reactivity and the hydrogen absorbing site of the alloy powder.

Additionally, alloy (i) of Example 7 using potassium permanganate yielded a battery performance substantially equal to those yielded by alloys (d) to (g) of Example 6 each using a hydrogen peroxide solution.

The battery using alloy (k) of Comparative Example 3 was inferior to the batteries using alloys (d) to (i) of the present examples, particularly in terms of the cycle life. Presumably, this was partly attributed to the reduced magnetic substance content in alloy (k). On the other hand, the battery using alloy (l), which had a magnetic substance content equal to those of the powders of the present examples, had a significantly shorter cycle life, although it exhibited a high-rate discharge property substantially equal to those of the powders of the present examples. This was considered to be attributed to the acid treatment conducted in Comparative Example 4. Japanese Patent Application No. hei 10-332399 discloses in the specification that the use of a peroxide in the presence of acetic acid induces the formation of peracetic acid ions, as a result of which elements such as rare earth elements, Al and Mn are easily dissolved to effectively form fine metallic Ni in such a manner so as to cover the surface of the alloy powder. However, the dissolution behaviors of such elements are different from the actual dissolution behaviors thereof in a highly concentrated alkaline solution inside the battery. Therefore, it was believed that the cycle life of the battery of Comparative Example 4 decreased because the actual dissolved amount of the constituting elements of alloy (l) inside the obtained battery was greater than the dissolved amounts of the constituting elements of the alloy powders of the present examples, inducing the depletion of the electrolyte.

In order to confirm the above, batteries were fabricated by using alloy powders which had been exposed to various pHs after either an alkali treatment or a treatment with an oxidizing agent to evaluate the battery performance. As a result, it was found that the cycle life decreased when the pH was in the acid region. The reason was considered to be that an Ni-rich layer, which had been formed on the surface of the alloy powder through the alkali treatment, was exposed to an oxidizing atmosphere, deteriorating the corrosion resistance of the layer to a highly concentrated alkaline solution. Consequently, the depletion of the electrolyte due to the corrosion of the alloy powder was induced, resulting in a decrease in the cycle life.

From the above, it is preferred that the pH of a treating condition is maintained at 7 or above.

EXAMPLE 9

Next, the influence of the stirring in the third step of Example 6 was investigated by making a comparison between alloy (f) produced with stirring and alloy (f') produced without stirring. The temperature of alloy (f') increased to 50° C. during the dehydration under pressure.

This was because hydrogen peroxide did not uniformly act on the alloy powder in the case of alloy (f') produced without stirring, so that the effect of suppressing heat generation was decreased. This demonstrates that it is important to add a hydrogen peroxide solution, while stirring.

When adding hydrogen peroxide solution to water containing the alloy powder, it is preferable to add it slowly so as not to generate a bubble. Rapid addition causes the decomposition reaction of hydrogen peroxide all at once, thereby possibly generating a large amount of gas. Furthermore, it causes the added hydrogen peroxide to decompose to impair the effect of the hydrogen peroxide in removing hydrogen inside the alloy powder.

EXAMPLE 10

An alloy powder was produced in the same manner as in Example 6, except for varying the concentrations of the aqueous NaOH solution, treating temperatures and treating times in the first step. By using the alloy powder thus produced, an open-type battery similar to that of Example 1 was fabricated. The capacity of the negative electrode was also approximately 900 mAh and the capacity of this battery was restricted by the negative electrode.

AC impedance measurement was conducted on the resultant battery in the same manner as in Example 1 to examine the relation between the magnetic substance content in the electrode alloy powder and the reaction resistance per unit weight of the alloy powder. As a result, a similar tendency to that shown in FIG. 4 was observed.

Thereafter, the same battery was charged at 25° C. at a 10-hour rate for 15 hours, and then discharged at a 5-hour rate until the potential of the negative electrode became −0.6 V versus the reference electrode. This cycle was repeated for 10 times to examine the relation between the magnetic substance content in the electrode alloy powder and the capacity per unit weight of the alloy powder at the 10th cycle. As a result, a similar tendency to that shown in FIG. 4 was observed.

These results demonstrate that the use of an oxidizing agent in the production process does not decrease the activity of the resultant alloy.

As long as a hydrogen storage alloy containing a predetermined amount of Ni is used as the starting powder, the present invention is considered to be effective, irrespective of the composition of the hydrogen storage alloy. Therefore, the present invention is also effective in the case of using as the starting powder: an $AB_2$ type hydrogen storage alloy comprising Zr, Ni and the like; a bcc type (body-centered cubic structure type) hydrogen storage alloy comprising Ti, V, Ni and the like; an Mg-Ni based hydrogen storage alloy or the like.

The present invention can effectively provide a highly conductive electrode alloy powder having a magnetic substance content of 3 to 9 wt % which is less prone to corrosion in an alkaline electrolyte and exhibits an excellent electrode activity even at the initial charge/discharge cycles. By using the electrode alloy powder of the present invention, an alkaline storage battery exhibiting a superior self-discharge property, high-rate discharge property and cycle life can be obtained.

The present invention can also safely provide an electrode alloy powder which can suppress oxidation and heat generation during the treating process.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method of producing an electrode alloy powder, comprising:

a first step of mixing a starting powder comprising a hydrogen storage alloy containing 20 to 70 wt % of Ni with water to moisten said starting powder;

a second step of immersing said moistened starting powder in an aqueous solution containing 30 to 80 wt % of sodium hydroxide at a temperature of 90° C. or higher and;

a third step of washing with water said powder which has been subjected to said second step.

2. The method of producing an electrode alloy powder in accordance with claim 1, further comprising a fourth step of mixing said washed powder with an oxidizing agent in water after said third step.

3. The method of producing an electrode alloy powder in accordance with claim 1, wherein said starting powder has a $CaCu_5$ type crystal structure and comprises an alloy containing a mixture of rare earth element, Ni, Co, Mn and Al.

4. The method of producing an electrode alloy powder in accordance with claim 3, wherein a Co content in said starting powder is 6 wt % or less.

5. The method of producing an electrode alloy powder in accordance with claim 1, wherein a mean particle size of said starting powder is 5 to 30 μm.

6. The method of producing an electrode alloy powder in accordance with claim 1, wherein an oxygen content in said starting powder is 1 wt % or less.

7. The method of producing an electrode alloy powder in accordance with claim 1, wherein said first step is a step of pulverizing coarse particles of a hydrogen storage alloy containing 20 to 70 wt % of Ni under an aqueous condition to have a mean particle size of 5 to 30 μm.

8. The method of producing an electrode alloy powder in accordance with claim 1, wherein said second step is a step of immersing said starting powder in said aqueous solution containing 30 to 80 wt % of sodium hydroxide for 0.2 to 3 hours.

9. The method of producing an electrode alloy powder in accordance with claim 1, wherein said third step is a step of washing with water said powder which has been subjected to said second step, until a pH of used water becomes 9 or less.

10. The method of producing an electrode alloy powder in accordance with claim 2, wherein said fourth step is a step of adding said oxidizing agent to water having a pH of 7 or more in which said washed powder is dispersed.

11. The method of producing an electrode alloy powder in accordance with claim 2, wherein said fourth step is a step of adding, while stirring, a hydrogen peroxide solution to water having a pH of 7 or more in which said washed powder is dispersed.

12. The method of producing an electrode alloy powder in accordance with claim 11, wherein an amount of hydrogen peroxide to be added is 0.5 to 15 parts by weight per 100 parts by weight of said washed powder.

13. An electrode alloy powder produced by the method in accordance with claim 1, wherein said starting powder contains 3 to 9 wt % of a magnetic substance comprising metallic nickel.

14. A battery comprising said electrode alloy powder in accordance with claim 13.

* * * * *